(12) United States Patent
Wu et al.

(10) Patent No.: US 12,395,055 B2
(45) Date of Patent: Aug. 19, 2025

(54) ELECTRIC MOTOR WITH DOUBLE STATORS

(71) Applicant: Industrial Technology Research Institute, Hsinchu (TW)

(72) Inventors: Yu-Hsun Wu, Taipei City (TW); Kuo-Lin Chiu, Taoyuan (TW); Ya-Ling Chang, Hsinchu County (TW); Chun-Chieh Chang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 295 days.

(21) Appl. No.: 18/133,759

(22) Filed: Apr. 12, 2023

(65) Prior Publication Data

US 2024/0235349 A1 Jul. 11, 2024

(30) Foreign Application Priority Data

Jan. 9, 2023 (TW) .................. 112100923

(51) Int. Cl.
  *H02K 16/04* (2006.01)
  *H02K 1/02* (2006.01)
  *H02K 1/276* (2022.01)
(52) U.S. Cl.
  CPC ........... *H02K 16/04* (2013.01); *H02K 1/02* (2013.01); *H02K 1/2766* (2013.01); *H02K 2201/03* (2013.01)
(58) Field of Classification Search
  CPC ........ H02K 16/04; H02K 1/02; H02K 1/2766; H02K 2201/03; H02K 1/16; H02K 1/276; H02K 1/279; H02K 2213/03
  See application file for complete search history.

(56) References Cited

U.S. PATENT DOCUMENTS

2006/0103253 A1  5/2006  Shiga et al.
2009/0115361 A1  5/2009  Nitta
(Continued)

FOREIGN PATENT DOCUMENTS

CN   104578636        4/2015
CN   114520576 A      5/2022
(Continued)

OTHER PUBLICATIONS

Wang et al. "Design of high-torque-density double-stator permanent magnet brushless motors", 2011, IET.
(Continued)

*Primary Examiner* — Thomas Truong
(74) *Attorney, Agent, or Firm* — WPAT, PC

(57) ABSTRACT

An electric motor with double stators includes a first stator, a first stator and a rotor assembly. The rotor assembly is located between the first stator and the second stator in a radial direction. The rotor assembly includes a rotor body, a plurality of first rotor slots, a plurality of second rotor slots, a plurality of first magnets, and a plurality of second magnets. A first air gap is formed between the rotor body and the first stator, and a second air gap is formed between the rotor body and the second stator. The material of the first magnets is different to the material of the second magnets, and any position of the first magnets is different to any position of the second magnets.

21 Claims, 2 Drawing Sheets

(56) References Cited

U.S. PATENT DOCUMENTS

| | | |
|---|---|---|
| 2010/0176679 A1 | 7/2010 | Ichiyama |
| 2016/0164386 A1* | 6/2016 | Kusase .................. H02K 16/04 |
| | | 310/156.01 |
| 2019/0267865 A1 | 8/2019 | Furukawa |
| 2020/0090844 A1* | 3/2020 | Hagiwara .............. H02K 1/276 |
| 2021/0104924 A1* | 4/2021 | Hu ....................... H02K 1/2746 |
| 2021/0135554 A1 | 5/2021 | Ni |

FOREIGN PATENT DOCUMENTS

| | | |
|---|---|---|
| CN | 216649354 U | 5/2022 |
| CN | 114629319 A | 6/2022 |
| KR | 20220164175 A | 12/2022 |
| TW | 201115880 A | 5/2011 |
| TW | 202135433 A | 9/2021 |
| TW | 202230933 A | 8/2022 |

OTHER PUBLICATIONS

Abbasian et al. "Double-Stator Switched Reluctance Machines (DSSRM): Fundamentals and Magnetic Force Analysis", Sep. 2010, IEEE.

Zong et al. "Comparison of Double-Stator Flux-Switching Permanent Magnet Machine and Double-Stator Permanent Magnet Synchronous Machine for Electric Vehicle Applications", Oct. 2014, ICEMS.

Kim et al. "Analysis and Design of a Double-Stator Flux-Switching Permanent Magnet Machine Using Ferrite Magnet in Hybrid Electric Vehicles", Jul. 2016, IEEE.

Chai et al. "Performance Analysis of Double-Stator Starter Generator for the Hybrid Electric Vehicle", Jan. 2015, IEEE.

Bostanci et al. "Performance Improvement and Comparison of Concentrated Winding Segmental Rotor and Double Stator Switched Reluctance Machines", 2016, IEEE.

TW OA issued on Jan. 25, 2024.

\* cited by examiner

ELECTRIC MOTOR WITH DOUBLE STATORS

CROSS REFERENCE TO RELATED APPLICATION

This application claims the benefits of Taiwan application Serial No. 112100923, filed on Jan. 9, 2023, the disclosures of which are incorporated by references herein in its entirety.

TECHNICAL FIELD

The present disclosure relates in general to an electric motor with double stators.

BACKGROUND

Recently, developments of magnetic materials and electric/electronic technologies have successfully provided permanent magnetic motors with higher power density and various advantages in reducing size and weight of the motor. In addition, since no current loss at the rotor of inductive motor shall be concerned, the corresponding efficiency can be further enhanced. With merits in high efficiency and high power, the permanent magnetic synchronous motor has gradually replaced the conventional inductive motor to become drive power for different technological products, such as aerospace crafts, machine tools, mechanical robots and so on.

Nevertheless, though the permanent magnetic motor may have an excellent power density, yet the associated cost problem is always a concern. In particular, the price of magnet goes high recently. With limitations at magnets in productions and sources, a cost reduction in motors can't be expected.

Thus, in considering the cost, a motor that needs a higher power density and higher torque without sacrificing the entire volume is definitely urgent to the skill in the art.

SUMMARY

In this disclosure, an electric motor with double stators is provided to reduce the cost of motor magnets and simultaneously obtain a similar power density.

In one embodiment of this disclosure, an electric motor with double stators includes a first stator, a second stator and a rotor assembly. The rotor assembly, disposed in a radial direction between the first stator and the second stator, includes a rotor body, a plurality of first rotor slots, a plurality of second rotor slots, a plurality of first magnets and a plurality of second magnets. A first air gap is formed between the rotor body and the first stator, and a second air gap is formed between the rotor body and the second stator. Positions of the plurality of first rotor slots are not identical to those of the plurality of second rotor slots. Each of the plurality of first rotor slots is furnished thereinside with one of the plurality of first magnets, and each of the plurality of second rotor slots is furnished thereinside with one of the plurality of second magnets. A material for producing the plurality of first magnets is different to that for producing the plurality of second magnets. Remanence of each of the plurality of first magnets is ranged within 0.8~1.3 tesla, and that of each of the plurality of second magnets is ranged within 0.3~0.5 tesla.

In another embodiment of this disclosure, an electric motor with double stators includes a first stator, a second stator and a rotor assembly. The rotor assembly, disposed in a radial direction between the first stator and the second stator, includes a rotor body, a plurality of first rotor slots, a plurality of second rotor slots, a plurality of first magnets and a plurality of second magnets. A first air gap is formed between the rotor body and the first stator, and a second air gap is formed between the rotor body and the second stator. The plurality of first rotor slots are individually arranged in a circumferential direction of the rotor body, and the plurality of second rotor slots are individually arranged in a radial direction of the rotor body. Each of the plurality of first rotor slots is furnished thereinside with one of the plurality of first magnets, and each of the plurality of second rotor slots is furnished thereinside with one of the plurality of second magnets. A material for producing the plurality of first magnets is different to that for producing the plurality of second magnets. A flux density of each of the plurality of first magnets is higher than that of each of the plurality of second magnets.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
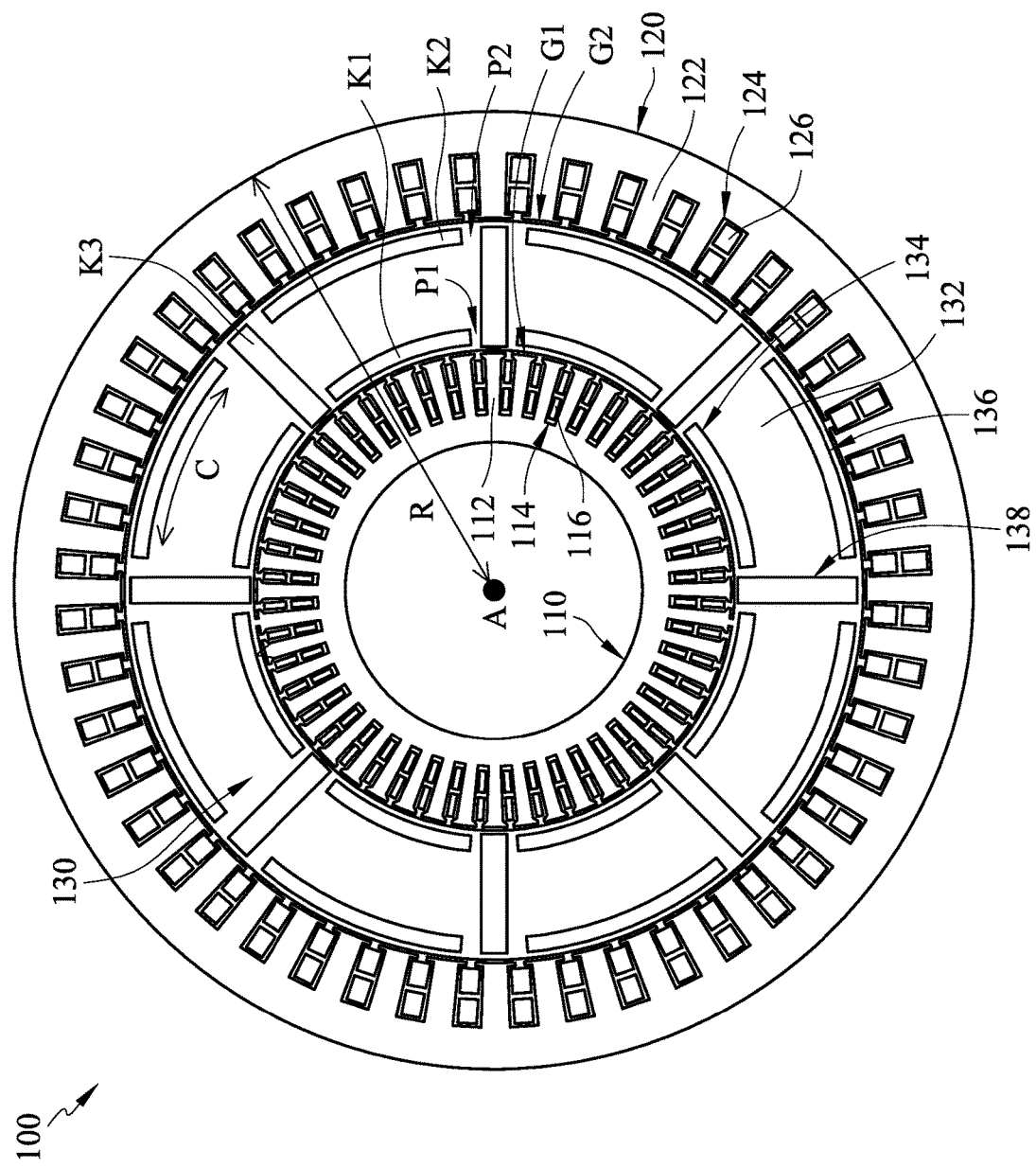
FIG. 1 is a schematic view of an embodiment of the electric motor with double stators in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be noted that in the description of various embodiments, the so-called "first", "second" and "third" are used to describe different elements, and these elements are not limited by such predicates. In addition, for the convenience and clarity of description, the thickness or size of each element in the drawings is expressed in an exaggerated, omitted or approximate manner for the understanding and reading of those skilled in the art. The size of each element has no technical significance, is not the actual size, and is also not used to limit the implementation of this disclosure. Any modification of structure, any change of proportional relationship, or any adjustment of size will not affect the content of this disclosure. Possible functions or goals that can be achieved should still fall within the scope covered by the technical content disclosed in this disclosure.

FIG. 1 is a schematic view of an embodiment of the electric motor with double stators in accordance with this disclosure. As shown, in this embodiment, the electric motor with double stators 100 includes a first stator 110, a second stator 120 and a rotor assembly 130. The first stator 110, the rotor assembly 130 and the second stator 120 apply a common axis A, and the rotor assembly 130 is located radially (i.e., in a radial direction R) between the first stator 110 and the second stator 120. The first stator 110 includes a plurality of first stator teeth 112, a plurality of first stator slots 114 and a plurality of first coils 116. Every two neighboring first stator teeth 112 are furnished with one said first stator slot 114. One said first coil 116 is disposed inside one said first stator slot 114. The first coil 116 is formed by winding around the corresponding first stator tooth 112. These first stator slots 114 are arranged radially. The second stator 120 includes a plurality of second stator teeth 122, a plurality of second stator slots 124 and a plurality of second coils 126. Every two neighboring second stator teeth 122 is furnished with one said second stator slot 124. The second stator slot 124 is furnished thereinside with one said second coil 126. The second coil 126 is formed by winding around one corresponding second stator slot 124, and these second stator slots 124 are arranged radially.

In this disclosure, the rotor assembly 130 includes a rotor body 132, a plurality of first rotor slots 134, 136, a plurality of second rotor slots 138, a plurality of first magnets K1, K2, and a plurality of second magnets K3. A first air gap G1 is formed between the rotor body 132 and the first stator 110, and a second air gap G2 is formed between the rotor body 132 and the second stator 120, such that a double air-gap structure with two stators is formed.

In this disclosure, the rotor body 132 can be made of silicon steel or iron. The first rotor slots 134, 136 and the second rotor slots 138 are opening slots provided individually in the rotor body 132. Positions of the first rotor slots 134, 136 are different to those of the second rotor slots 138. The first rotor slots 134, 136 are individually arranged in a circumferential direction C of the rotor body 132, and the first rotor slots 134 are close to the first air gap G1, while the other first rotor slots 136 are close to the second air gap G2. Every two neighboring first rotor slots 134 are spaced by a spacing P1, and every two neighboring first rotor slots 136 are spaced by another spacing P2. The second rotor slots 138 are arranged individually in a radial direction R of the rotor body 132, and each of the second rotor slots 138 is extended radially. One end of the second rotor slot 138 is disposed between two adjacent spacings P1, while another end thereof is disposed between two adjacent spacings P2.

Figure 2:
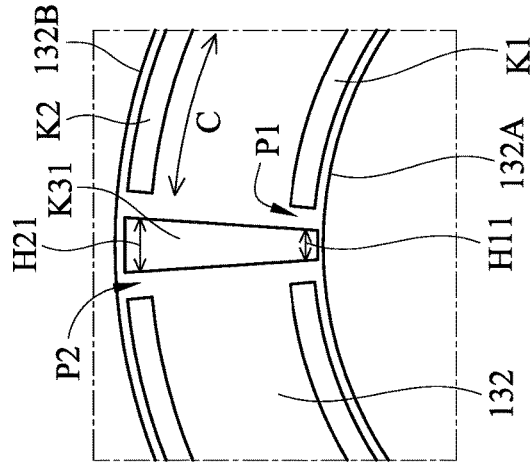
FIG. 2 is a schematic enlarged view of the first magnet and the second magnet in the rotor assembly of FIG. 1.

Practically, as shown in FIG. 2, the rotor body 132 has an inner circular surface 132A and an outer circular surface 132B. The first rotor slot 134 can be formed as inner rotor slots sequentially arranged close to the inner circular surface 132A. The first rotor slots 136 can be formed as outer rotor slots sequentially arranged close to the outer circular surface 132B. In addition, the number of the first rotor slots 134 (i.e., the inner rotor slots) is equal to that of the first rotor slots 136 (i.e., the outer rotor slots). In addition, the number of the second rotor slots 138 is equal to that of the first rotor slots 134 (i.e., the inner rotor slots) or the first rotor slot 136 (i.e., the outer rotor slots). In some other embodiments, any of the opposite ends of each the second rotor slot 138 can be disposed at a location other than the position between the inner rotor slot (i.e., the first rotor slot 134) and the outer rotor slot (i.e., the first rotor slot 136); i.e., not in the spacing P1 or P2.

In this embodiment, arrangements of the first magnets K1, K2 and the second magnets K3 are different, such that the magnetization directions of the first magnets K1, K2 would be different to the magnetization directions of the second magnets K3. In this disclosure, magnetization would be performed by applying a magnetic field of a permanent magnet in a magnetic field orientation direction and then increasing the magnetic field strength gradually till a technical saturation state. As shown in FIG. 1 and FIG. 2, the first rotor slot 134 can be furnished thereinside with the first magnet K1, the first rotor slot 136 can be furnished thereinside with the first magnet K2, and the second rotor slot 138 can be furnished thereinside with the second magnet K3. Both the first magnets K1 close to the inner circular surface 132A and the first magnets K2 close to the outer circular surface 132B have corresponding magnetic fields with radial magnetic lines roughly to pass the axis A. The first magnets K1, K2 are arranged to extend in the circumferential direction C of the rotor body 132 by having the first magnets K1 to be adjacent to the first air gap G1 and the first magnets K2 to be adjacent to the second air gap G2. On the other hand, each of the second magnets K3 is extended in the radial direction R of the rotor body 132. Each of the second magnets K3 is extended from the corresponding first magnet K1 to the corresponding first magnet K2, such that the magnetic direction of any first magnet in K1 or K2 is orthogonal to that of the corresponding second magnet K3. In one embodiment, the number of the first magnets K1 along the inner wall of the rotor body 132 is equal to the number of the first magnets K2 along the outer wall of the rotor body 132, and also equal to the number of the second magnets K3.

In this disclosure, materials of the first magnets K1, K2 are different to those of the second magnets K3. In one embodiment, each of the first magnets K1, K2 has a range of remanence broader than the second magnet K3 does. For example, the remanence of the first magnets K1, K2 can have a range of 0.8~1.3 tesla, while the remanence of the second magnets K3 has a range of 0.3~0.5 tesla.

In another embodiment, the flux density of any of these first magnets K1, K2 is higher than that of the second magnet K3. Such a high-low flux density pair of magnets can increase the entire flux density of the double stators with the double air-gap structure (i.e., the first air gap G1 and the second air gap G2) in accordance with this disclosure, and can also avoid possible magnetic leakage. For example, the first magnet K1 or K2 can be a high flux-density magnet, such as a rare earth magnet (an Nd—Fe—B magnet for example), and the second magnet K3 can be a low flux-density magnet such as a ferrite magnet.

Under such an arrangement, the double stator structure with double air gaps of this disclosure introduces a rotor design to pair magnets arranged at least two different directions. Without altering the entire volume of the motor, the double stator structure with at least two magnet-arranged directions of this disclosure can be installed into the room inside the motor. As such, the magnetic leakage can be avoided. In addition, the magnetic coupling rate can be strengthened, the power density can be kept high, and also the flux density for this double air gap structure can be increased.

Further, in this disclosure, the magnets made of at least two different materials are provided. For example, a high flux-density magnet or a magnet having the remanence of 0.8~1.3 tesla (for the first magnet K1 or K2) is applied close to the air gap G1 or G2, and a low flux-density magnet or a magnet having the remanence of 0.3~0.5 tesla (for the second magnet K3) is applied to form orthogonal magnetic pairs with the inner or outer magnets (i.e., the first magnets K1 or K2). The disposition of the second magnet K3 shall be arranged to separate radially the neighboring magnets (i.e., the first magnet K1 and the corresponding first magnet K2). Thereupon, even that the magnets of this design are not all the high magnetic magnets, this design can still provide a sufficient high power density, such that the cost of magnets can be reduced without sacrificing the power density.

In one exemplary example, if example 1 is an application equipped with all strong magnets such as Nd—Fe—B magnets, and example 2 is an application equipped with part of strong magnets such as Nd—Fe—B magnets and part of non-strong magnets such as ferrite magnets, then a difference of power density between these two applications might be only 2~3%, but the cost of example 2 might be reduced by about 10~15%.

In the embodiment, the number of the first magnets K1 or K2 is P1, and the number of the first rotor slots 134 or 136 is N1, in which N1 and P1 are both positive integers. The number of the second magnets K3 is P2, and the number of the second rotor slots 138 are N2, in which N2 and P2 are both integers, and P1 and P2 are both even numbers. In one embodiment, N1=P1, and N2=P2, as shown in FIG. 1. Each of the first rotor slots 134 is provided thereinside with one said first magnet K1, each of the first rotor slots 136 is provided thereinside with one said first magnet K2, and each of the second rotor slots 138 is provided thereinside with one said second magnet K3. In another embodiment, N1>P1, and N2>P2. Namely, part of the first rotor slots 134 or 136 are individually provided with the first magnets K1 or K2, respectively; but, the rest of the first rotor slots 134, 136 are not provided thereinside with any first magnet K1, K2. In addition, part of the second rotor slots 138 are individually provided with the second magnets K3, and the rest of the second rotor slots 138 are not provided thereinside with any second magnet K3.

As shown in FIG. 1 and FIG. 2, each of the first magnets K1, K2 is shaped as a sector or an arc to extend along the inner circular surface 132A or the outer circular surface 132B, respectively. On the other hand, the second magnet K3 is shaped as a rectangle extending to connect the corresponding two first magnets K1, K2, such that one end of the second magnet K3 is located in the spacing P1 between the two adjacent first magnets K1, while another end thereof is located in another spacing P2 between the two adjacent first magnets K2. In particular, a width H1 of one end of the second magnet K3 is equal to a width H2 of another end of the second magnet K3. Of course, shapes of the first rotor slots 134, 136 are varied with shapes of the first magnets K1, K2, and also a shape of the second rotor slot 138 is varied with a shape of the second magnet K3.

Figure 3:
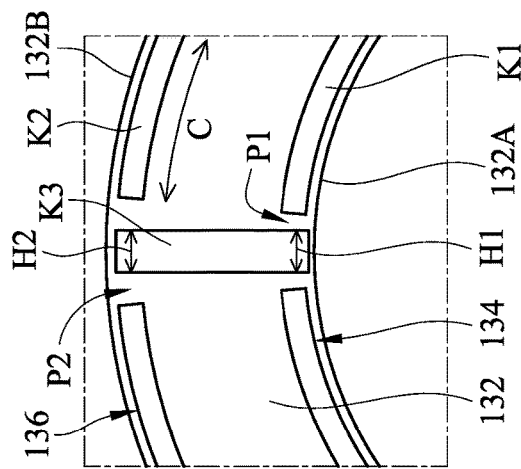
FIG. 3 is a schematic view of the first magnet and the second magnet in the rotor assembly of another embodiment of the electric motor with double stators in accordance with this disclosure.
Figure 4:
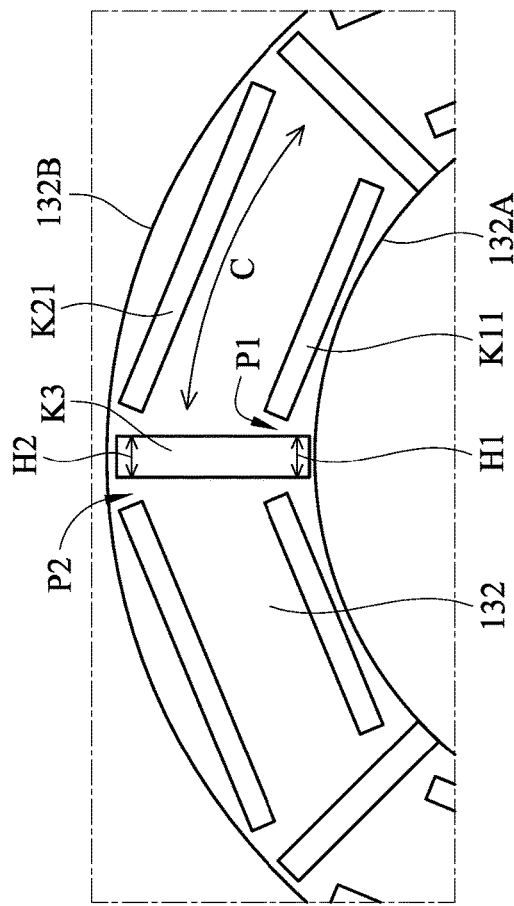
FIG. 4 is a schematic view of the first magnet and the second magnet in the rotor assembly of a further embodiment of the electric motor with double stators in accordance with this disclosure.

However, this disclosure is not limited to the aforesaid limitations. As shown in FIG. 3, the shapes of the first magnets K1, K2 are still sectors or arcs, but the shape of the second magnet K31 is a trapezoid. One end of the second magnet K31 is located in the spacing P1 between the two adjacent first magnets K1, while another end thereof is located in another spacing P2 between the two adjacent first magnets K2. In particular, a width H11 of one end of the second magnet K31 is less than a width H21 of another end of the second magnet K31. In another embodiment shown in FIG. 4, both the shape of the second magnet K3 of FIG. 4 and the shape of the second magnet K3 of FIG. 2 are rectangles; but, the shapes of the first magnets K11 and K21 are rectangles extending closely along the inner circular surface 132A and the outer circular surface 132B, respectively. In some other embodiments not shown in the figure, the shapes illustrated in FIG. 1 to FIG. 4 can be paired arbitrarily, and are not limited thereto.

In summary, the double stator structure with double air gaps provided in this disclosure integrates a rotor structure having at least two different magnet arrangements. As such, without altering the entire volume of the motor, the double stator structure with at least two magnet-arranged directions can be installed into the room inside the motor, such that the magnetic leakage can be avoided, the magnetic coupling rate can be strengthened, the power density can be kept high, and also the flux density for this double air gap structure can be increased.

Further, in this disclosure, the magnets made of at least two different materials are provided. For example, a high flux-density magnet or a magnet having the remanence of 0.8~1.3 tesla is applied close to the air gap (the circumferential magnet), and a low flux-density magnet or a magnet having the remanence of 0.3~0.5 tesla is applied to form orthogonal magnetic pairs with the inner or outer circumferential magnets. The disposition of the radial magnet can be arranged to separate radially the neighboring circumferential magnets. Thereupon, even that the magnets of this design are not all the high magnetic magnets, this design can still provide a sufficient high power density, such that the cost of magnets can be reduced without sacrificing the power density.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An electric motor with double stators, comprising:
   a first stator;
   a second stator; and
   a rotor assembly, disposed in a radial direction between the first stator and the second stator, including a rotor body, a plurality of first rotor slots, a plurality of second rotor slots, a plurality of first magnets and a plurality of second magnets, a first air gap being formed between the rotor body and the first stator, a second air gap being formed between the rotor body and the second stator, the positions of the plurality of first rotor slots being not identical to those of the plurality of second rotor slots, each of the plurality of first rotor slots being furnished thereinside with one of the plurality of first magnets, each of the plurality of second rotor slots being furnished thereinside with one of the plurality of second magnets, a material for producing the plurality of first magnets being different to that for producing the plurality of second magnets, remanence of each of the plurality of first magnets being ranged within 0.8~1.3 tesla, remanence of each of the plurality of second magnets being ranged within 0.3~0.5 tesla;
   wherein the rotor body has an inner circular surface and an outer circular surface, the plurality of first rotor slots include a plurality of inner rotor slots and a plurality of outer rotor slots, the plurality of inner rotor slots are sequentially arranged close to the inner circular surface, the plurality of outer rotor slots are sequentially arranged close to the outer circular surface, and an inner end of each of the plurality of second rotor slots is disposed between neighboring two of the plurality of inner rotor slots while an outer end thereof is disposed between neighboring two of the plurality of outer rotor slots.

2. The electric motor with double stators of claim 1, wherein the plurality of first rotor slots are arranged in a circumferential direction of the rotor body, and the plurality of second rotor slots are arranged in the radial direction of the rotor body.

3. The electric motor with double stators of claim 1, wherein a number of the plurality of inner rotor slots is equal to a number of the plurality of outer rotor slots.

4. The electric motor with double stators of claim 1, wherein a number of the plurality of second rotor slots is equal to a number of the plurality of inner rotor slots, and the number of the plurality of second rotor slots is equal to a number of the plurality of outer rotor slots.

5. The electric motor with double stators of claim 1, wherein the plurality of inner rotor slots are individually disposed close to the first air gap, and the plurality of outer rotor slots are individually disposed close to the second air gap.

6. The electric motor with double stators of claim 1, wherein the plurality of second magnets are individually arranged in the radial direction of the rotor body, and each of the plurality of second magnets is extended between two of the plurality of first magnets.

7. The electric motor with double stators of claim 1, wherein a flux density of each of the plurality of first magnets is higher than a flux density of each of the plurality of second magnets.

8. The electric motor with double stators of claim 1, wherein each of the plurality of first magnets is a high flux-density magnet, and each of the plurality of second magnets is a low flux-density magnet.

9. The electric motor with double stators of claim 1, wherein each of the plurality of first magnets is a rare earth magnet, and each of the plurality of second magnets is a ferrite magnet.

10. The electric motor with double stators of claim 1, wherein each of the plurality of first magnets is an Nd—Fe—B magnet, and each of the plurality of second magnets is a ferrite magnet.

11. The electric motor with double stators of claim 1, wherein each of the plurality of second rotor slots is disposed between neighboring two of the plurality of first rotor slots.

12. An electric motor with double stators, comprising:
a first stator;
a second stator; and
a rotor assembly, disposed in a radial direction between the first stator and the second stator, including a rotor body, a plurality of first rotor slots, a plurality of second rotor slots, a plurality of first magnets and a plurality of second magnets, a first air gap being formed between the rotor body and the first stator, a second air gap being formed between the rotor body and the second stator, the plurality of first rotor slots being individually arranged in a circumferential direction of the rotor body, the plurality of second rotor slots being individually arranged in a radial direction of the rotor body, each of the plurality of first rotor slots being furnished thereinside with one of the plurality of first magnets, each of the plurality of second rotor slots being furnished thereinside with one of the plurality of second magnets, a material for producing the plurality of first magnets being different to that for producing the plurality of second magnets, a flux density of each of the plurality of first magnets being higher than that of each of the plurality of second magnets;
wherein the rotor body has an inner circular surface and an outer circular surface, the plurality of first rotor slots include a plurality of inner rotor slots and a plurality of outer rotor slots, the plurality of inner rotor slots are sequentially arranged close to the inner circular surface, the plurality of outer rotor slots are sequentially arranged close to the outer circular surface, and an inner end of each of the plurality of second rotor slots is disposed between neighboring two of the plurality of inner rotor slots while an outer end thereof is disposed between neighboring two of the plurality of outer rotor slots.

13. The electric motor with double stators of claim 12, wherein a number of the plurality of inner rotor slots is equal to a number of the plurality of outer rotor slots.

14. The electric motor with double stators of claim 12, wherein a number of the plurality of second rotor slots is equal to a number of the plurality of inner rotor slots, and the number of the plurality of second rotor slots is equal to a number of the plurality of outer rotor slots.

15. The electric motor with double stators of claim 12, wherein the plurality of inner rotor slots are individually disposed close to the first air gap, and the plurality of outer rotor slots are individually disposed close to the second air gap.

16. The electric motor with double stators of claim 12, wherein the plurality of second magnets are individually arranged in the radial direction of the rotor body, and each of the plurality of second magnets is extended between two of the plurality of first magnets.

17. The electric motor with double stators of claim 12, wherein each of the plurality of first magnets is a high flux-density magnet, and each of the plurality of second magnets is a low flux-density magnet.

18. The electric motor with double stators of claim 12, wherein each of the plurality of first magnets is a rare earth magnet, and each of the plurality of second magnets is a ferrite magnet.

19. The electric motor with double stators of claim 12, wherein each of the plurality of first magnets is an Nd—Fe—B magnet, and each of the plurality of second magnets is a ferrite magnet.

20. The electric motor with double stators of claim 12, wherein remanence of each of the plurality of first magnets is ranged within 0.8~1.3 tesla, and remanence of each of the plurality of second magnets is ranged within 0.3~0.5 tesla.

21. The electric motor with double stators of claim 12, wherein each of the plurality of second rotor slots is disposed between neighboring two of the plurality of first rotor slots.

* * * * *